Sept. 24, 1963    G. SWIFT    3,104,809
DIRECTIONAL SURVEY COMPUTER
Filed Nov. 13, 1959
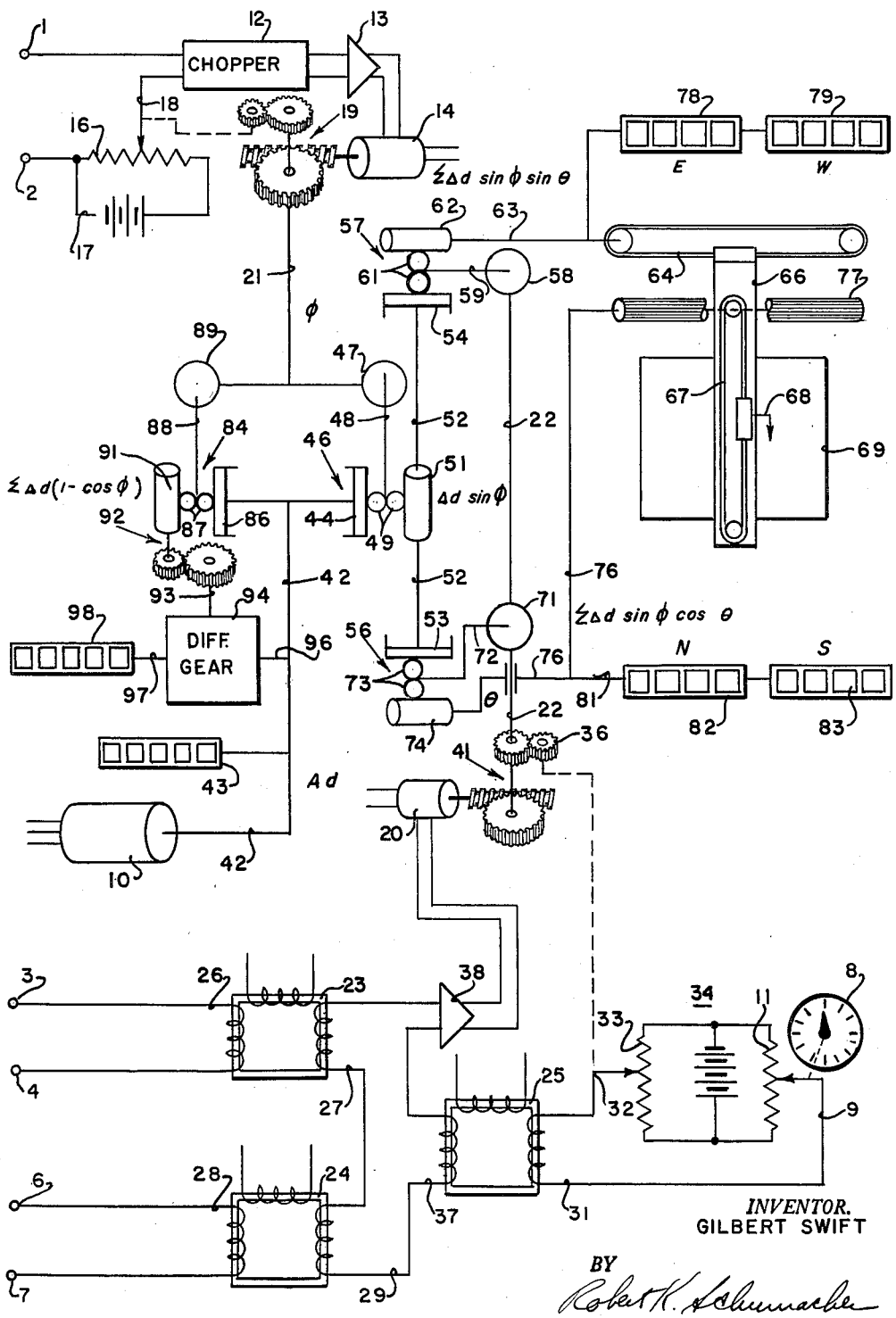
INVENTOR.
GILBERT SWIFT
BY
Robert K. Schumacher
ATTORNEY

United States Patent Office 3,104,809
Patented Sept. 24, 1963

3,104,809
DIRECTIONAL SURVEY COMPUTER
Gilbert Swift, Tulsa, Okla., assignor, by mesne assignments, to Dresser Industries, Inc., Dallas, Tex., a corporation of Delaware
Filed Nov. 13, 1959, Ser. No. 852,746
2 Claims. (Cl. 235—61)

The present invention relates to well surveying apparatus and more particularly to a well surveying computer for computing the horizontal displacement and direction of a bore hole with respect to the well entrance as a function of depth and further to determine the vertical depth of the bore hole rather than its total length.

The directional survey data obtainable from a well logging instrument are not easily interpreted even by the trained observer and, in accordance with present techniques, complex mathematical calculations are required to convert the data into a usable form. The data normally available from a well survey equipment relating to directional information is in the form of a voltage or pulse code proportional to the angle of deviation of the well bore from the vertical, the direction of deviation of the well bore with respect to a tool reference direction and the direction of magnetic north also with respect to the tool reference direction. In addition, information relating to the depth of the well is obtainable from a synchro transmitter driven directly from the well equipment cable so as to provide a continuous indication of the depth of the subsurface equipment. All of these indications are normally recorded on graphs with the depth constituting the length coordinate of the chart paper and the other information being displayed as amplitude displacements transverse to the direction of movement of the graph. In order to determine the true depth of the well and the horizontal position of the well with respect to the well entrance, rather involved mathematical computations are required. The computation relating to true depth is determined by the equation $$\text{True depth} = \Sigma \Delta d \cos \phi \tag{1}$$

where $\Delta d$ is the depth increment (measured along the well bore) and $\phi$ is the angle of deviation of the well bore from the vertical applicable to the depth increment. In order to obtain the summation required by Equation 1 by graphical methods, it is necessary to determine the angle of the well with respect to vertical at a number of closely spaced points along the aforesaid graph, look up the cosine of the angle for each of these points and compute the value of the vertical components of each of the incremental depths between each measurement by multiplying each incremental depth by the cosine of the angle. Thereafter, all of these incremental values are summed to determine the true depth of the well. Obviously, such a computation is tedious and the probability of error is quite large.

The computation of the north-south and east-west components of the horizontal position of the well relative to the well entrance involves a pair of computations which are quite similar to that of Equation 1 above. Specifically, these computations are:

$$\text{North-south distance} = \sum_0^d \Delta d \sin \phi \cos \theta \tag{2}$$

$$\text{East-west distance} = \sum_0^d \Delta d \sin \phi \sin \theta \tag{3}$$

The angle $\theta$ is determined by the equation:

$$\theta = (\theta_\text{d} - \theta_\text{c} - \theta_\text{m}) \tag{4}$$

where $\theta_\text{d}$ is the direction of deviation of the well with respect to the tool reference direction, $\theta_\text{c}$ is the direction of the compass with respect to the tool reference direction, and $\theta_\text{m}$ is the magnetic declination measured eastward.

Analyzing Equations 2 and 3, the expression $\Delta d \sin \phi$ represents the projection of the well axis, lying at an angle $\phi$ with respect to the vertical, upon the horizontal plane and the angle of this projection with respect to north is the angle $\theta$. In order to determine the north-south and east-west components of this horizontal projection, it is necessary to multiply the terms of the projection; that is, $\Delta d \sin \phi$ by the cosine of $\theta$ and the sine of $\theta$ respectively. These quantities for each $\Delta d$ then must be summed from between zero and the depth under consideration in order to determine the north-south and east-west displacement of the well at any particular depth and these quantities are then represented by Equations 2 and 3. To perform the computations indicated by Equations 2 and 3 is quite a complex operation and involves the taking of the functions of two different angles for each of the incremental depths measured along the graphs. In a normal computation, several hundred depths would be involved for the determination of north-south and east-west distances and each depth computation requires the looking up of three angles. Obviously, the probability of error in such computations is great and the time consumed is quite considerable.

It is an object of the present invention to provide a well survey computer for determining the quantities represented by Equations 1, 2, 3 and 4 concurrently with a well surveying operation.

It is another object of the present invention to provide a computer for plotting concurrently with the performance of a well logging operation, the vectorial summation of Equations 2 and 3 so that a continuous graph of the horizontal displacement of the well bore with respect to depth is obtained.

In accordance with the present invention, the signals directly available from the well survey equipment are applied to a computer which operates upon the signals to provide the desired indications. Specifically, the information relating to the deviation of the well bore from the vertical is normally converted at the surface station to a D.C. voltage for recording purposes and this voltage is applied to a closed loop servo system of the present apparatus which converts the D.C. signal to a shaft rotation proportional to the input signal. Further, voltages are available from the well equipment proportional to the direction of deviation of the well and the direction of the compass both with respect to the reference tool axis and these two voltages are applied to the computer. A third voltage is applied to the system relating to magnetic declination and a series of magnetic modulators are employed to compute the angle $\theta$ in accordance with Equation 4 above. The voltage representing the angle $\theta$ is applied to a closed loop servo system which positions a shaft in proportion to the voltage representing the angle. The last input quantity to the computer is a shaft rotation representative of the depth of the well tool and this shaft rotation is obtained directly from the synchro system which is driven by the well tool cable.

The rotation of the shaft relating to the quantity $\Delta d$ is combined in an integrator with the rotation of an output shaft of a sine taking mechanism driven from the shaft rotated in accordance with the angle $\phi$. The output of the integrator, therefore, corresponds to the first portion of Equations 2 and 3; that is, the $\Delta d \sin \phi$ portion of the equations. The shaft rotation proportional to the angle $\theta$ is fed through a sine taking mechanism to an integrator which receives as a second input the rotation of the output shaft of the aforesaid integrator so that the output of the second-mentioned integrator is a shaft rotation proportional to the Equation 3. The shaft whose rotation is proportional to the angle $\theta$ is also coupled to a cosine taking mechanism. The output shaft of this latter mechanism is applied to a third integrator, the second input to which is the output of the first integrator. In consequence, the output shaft of the third integrator rotates in accordance with the quantity represented by Equation 2.

A pen recording apparatus is positioned in one coordinate direction by the shaft whose rotation is representative of the Equation 2 and is positioned in a second coordinate direction by the shaft whose rotation is proportional to Equation 3. In consequence, the pen is driven in accordance with the vectorial summation of rotations of these two shafts, and a plot of the horizontal position of the well with respect to the well entrance is obtained as a function of depth of the well.

The shafts representative of the angle $\phi$, and the depth $\Delta d$ are also applied to a further integrator, the rotation proportional to the angle $\phi$ first being modified by a cosine mechanism. In this particular instance, the cosine mechanism, rather than providing a direct cosine function provides a cosine function representative of the quantity $(1-\cos \phi)$ so that the output of this last mentioned integrator is equal to $\Sigma \Delta d - \Delta d \cos \phi$. The output shaft of the integrator is now applied to a differential gear having applied to another input shaft thereof the quantity $\Delta d$. The quantity $\Delta d$ is now subtracted from the aforesaid quantity $\Sigma \Delta d - \Delta d \cos \phi$ so that the output of this differential gear is equal to $\Sigma \Delta d \cos \phi$ which is the function represented by Equation 1. In consequence, the output of the shaft of the differential gear rotates in accordance with the true vertical depth of the apparatus.

The cosine mechanism discussed above is employed to provide an output function of $1-\cos \phi$ rather than $\cos \phi$ since the angle $\phi$ is usually quite small and the mechanism would be operating in the region near unity in which region such mechanisms are normally relatively inaccurate. By employing a mechanism which provides the function $1-\cos \phi$, the output function is quite small, and the mechanism operates in a region in which it is quite accurate.

It is, therefore, another object of the present invention to provide a computer for determined the true depth of a well and its horizontal displacement from the well entrance as a function of depth, which computer employs mechanical integrators and mechanical sine and cosine taking mechanisms for performing the required computation.

It is still another object of the present invention to provide a well survey computer for plotting concurrently with the taking of a well survey, the horizontal position of the well relative to the well entrance as a function of depth and provides an indication of the true depth of the well, which computer employs a few relatively simple and rugged mechanical circuit elements.

The above and still further objects, features and advantages of the present invention will become apparent upon consideration of the following detailed description of one specific embodiment thereof, especially when taken in conjunction with the accompanying drawing, wherein:

The single FIGURE of the accompanying drawing is a partial schematic electrical diagram and a partial schematic mechanical diagram of the apparatus of the present invention.

Referring specifically to the single figure of the accompanying drawing, the apparatus is adapted to respond to raw data received directly from the well logging tool. A direct voltage proportional to the amount of deviation of the well tool is applied between input terminals 1 and 2, while a direct voltage proportional to the direction of deviation of the well axis from the vertical with respect to a referenced direction of the well tool is applied to the terminals 3 and 4. A direct voltage proportional to the direction of the compass relative to the referenced direction of the well tool is applied to input terminals 6 and 7; and if it is desired to obtain all directions relative to true rather than magnetic north, the magnetic declination in the area of the well log is applied to the instrument via a knob 8 connected to a slider 9 which is positionable on a resistor 11.

Each of the inputs is converted to a shaft rotation and, specifically, the voltage relating to the angle of well deviation with respect to the vertical is converted to shaft rotation by means of a chopper 12, an A.C. amplifier 13 and a servo motor 14. The D.C. signal applied to the terminals 1 and 2 is compared with a variable portion of the voltage developed across a resistor 16 by means of a battery 17. The difference between these two voltages is derived from the resistor 16 by means of a variable tap 18 driven via a suitable gear mechanism 19 from the servo motor 14. The voltage equal to the difference between the voltage applied to the leads 1 and 2 and the voltage developed at the tap 18 is applied to the chopper 12 and amplified by the A.C. amplifier 13. The servo motor 14 rotates until the position of the slider 18 is such that the voltage applied to the chopper 12 is reduced to zero. The servo motor 14 also drives a shaft 21 and the rotation applied to the shaft 21, therefore, is proportional to the D.C. input voltage applied to the terminals 1 and 2.

The information relating to direction of deviation of the well bore is converted, by means of three magnetic modulators 23, 24 and 25, and a servomotor 20, to rotation of a shaft 22. The information relating to the direction of well deviation which appears across terminals 3 and 4 is applied to a winding 26 of the magnetic modulator 23 and an alternating output voltage proportional to the input voltage is derived across an output winding 27. Similarly, the information relating to the direction of the compass, which appears across terminals 6 and 7, is applied to an input winding 28 of a modulator 24 and A.C. output signals proportional to the D.C. input signal appear across an output winding 29. A voltage is applied to an input winding 31 of the modulator 25 equal to the voltage appearing between the slider 9 and a further slider 32 positionable on a resistor 33, the sliders 9 and 32 constituting the conjugate output terminals of a Wheatstone bridge 34. The slider 32 is driven via a suitable gear mechanism 36 from the output shaft 22.

The output windings 27, 29 and 37 of the magnetic modulators 23, 24 and 25 respectively are arranged in series such that the voltages of windings 29 and 37 are subtracted from the voltage of winding 27. The motor 20 is energized via amplifier 38 by this remainder voltage and moves the slider 32, via shaft 22, until the voltage applied to the motor is reduced to zero. At this time, Equation 4 is solved and shaft 22 is positioned in accordance with the quantity $\theta$.

The third input quantity is converted directly to the shaft rotation by means of the synchro 10 which receives information from a synchro transmitter (not illustrated) rotated in accordance with the amount of cable payed out to the well tool. The synchro 10 drives an input shaft 42 in direct proportion to the amount of cable applied to the well and, therefore, the rotation of the shaft 42 is proportional to the quantity $\Delta d$. Thus, the information available from the well logging apparatus is convertible by the mechanisms just described to three shaft rotations which represent the only three units of information required for operation of the apparatus; specifically, the angle $\phi$ representing the angle of well deviation, the angle $\theta$ which is the angle between the direction of well deviation and true north, and the quantity $\Delta d$ representing the distance of the well tool from one end of the well.

Proceeding now to a description of the operation of the apparatus, in normal logging procedures, the logging run is started when the well tool is at the bottom of the well and is made as the well tool is being retracted. During movement of the well tool to the bottom of the well an odometer 43 which is driven directly from the shaft 42 and registers the depth of the well when the tool is at the bottom while all other odometers in the system, which are to be described subsequently, are set to zero. Further, the X—Y recorder, which will also be described subsequently, is given an initial position approximately in the center of its area of scan and the magnetic declination dial is now set to correspond to the actual declination of the locality being logged. Upon turning on of the logging equipment, D.C. signals are applied to the terminals 1—2, 3—4 and 6—7 and signals are also applied to the synchro receiver 10. Therefore, the shafts 21, 22 and 42 are rotated to positions corresponding respectively to the angles $\phi$ and $\theta$ and the distance $\Delta d$, which at this time is zero. As the subsurface equipment is raised, the depth-measuring synchro 10 begins to rotate the shaft 42 which turns an input table 44 of a ball-type integrator 46. The shaft 21 is connected as an input shaft to a sine resolving mechanism 47 which rotates its output shaft 48 in accordance with the sine of the angle applied to the shaft 21. The shaft 48 drives the cage of the balls 49 of the integrator 46. An output roller 51 of the integrator 46 is thus rotated in accordance with the quantity $\Delta d \sin \phi$ as is a shaft 52 which is driven by the roller.

The shaft 52 drives input tables 53 and 54 of further ball integrators 56 and 57 respectively. The shaft 22 is employed as an input shaft to a sine resolving mechanism 58 having an output shaft 59 which drives the cage of balls 61 of the ball integrator 57. In consequence, an output roller 62 of the integrator 57 is rotated in accordance with the quantity $\Sigma \Delta d \sin \phi \sin \theta$, which is the solution of Equation 3 cited above. The roller 62 drives a shaft 63 employed to translate an endless belt 64 to which is attached an arm 66 of the recording equipment. The arm 66 carries a further endless belt 67 to which is secured a pen recorder 68 adapted to record or to produce a trace on a graph or chart 69.

Rotative movement of the shaft 22 is also applied to a cosine taking mechanism 71 having an output shaft 72 rotated in accordance with the cosine of the angle $\theta$. The shaft 72 moves balls 73 of the ball integrator 56 relative to the plate 53 in accordance with the cos of the angle $\theta$ and an output roller 74 of the integrator 56 is rotated in accordance with the function $\Sigma \Delta d \sin \phi \cos \theta$ which is the solution of Equation 2 cited above. The output roller is coupled via a shaft 76 to an elongated gear 77 which produces translation of the endless belt 67 and, therefore, imparts vertical movement to the pen 68. In consequence, the pen is moved horizontally as viewed in the figure in accordance with east-west deviation of the well while it is moved up and down as viewed in the figure in accordance with north-south deviation of the well. In fact, the movements are so related that the north-south and east-west movements of the pen 68 correspond to these directions as normally viewed on a map.

The shaft 63 is coupled to east and west odometers 78 and 79 respectively while the shaft 76 is coupled via a shaft 81 to north and south odometers 82 and 83 respectively. The odometers are arranged in pairs and are of a type such that, rather than register a negative number, the number windows are covered by shutters, and thus only one of the odometers 78 or 79 and 82 or 83 produces an indication. The direction and amount of deviation of the well at the present depth of the well tool is thus readily apparent by reference to the odometers while the trace on the graph 69 indicates the direction and amount of horizontal movement of the well bore as a function of depth, the depth being read as the distance from the beginning of the line trace. The south odometer is caused to read positively while the pen is being moved to the north or vertically upward as viewed in the figure. Likewise east and west odometers are reversed with respect to the recorder. In consequence, as the survey logging instrument traverses the bore hole on its upward trip the odometers are caused to accumulate the reverse of the actual well drift but the X—Y recorder is caused to trace a pattern or map which is the actual well drift as would be seen from the surface. Upon completing the survey, the reading then remaining on the odometers properly represents the location of the bottom of the hole with respect to the surface location and the X—Y record may be made to depict the downward course of the bore hole by designating the end trace as the intersection of the well with the earth's surface.

An apparatus for computing the true vertical depth of the well includes a ball integrator 84 having an input plate 86 connected to be rotated by the shaft 42. The integrator 84 is provided with balls 87 whose cage is driven in accordance with the function $(1 - \cos \phi)$ via an output shaft 88 of a cosine taking mechanism 89 driven from the shaft 21. Thus, an output roller 91 of the integrator 84 is driven in accordance with the quantity $\Delta d - \Delta d \cos \phi$ which is applied through a suitable reduction gearing mechanism 92 to an input shaft 93 of a differential gear 94. The quantity $\Delta d$ is also applied to the differential gear mechanism 94 via a shaft 96 driven by the shaft 42 so that an output shaft 97 of the gear 94 is rotated in accordance with the quantity $\Delta d \cos \phi$ which is the quantity presented by Equation 1. The shaft 97 drives an odometer 98 which indicates the true depth of the well while the odometer 43 indicates the distance along the bore hole.

It is preferable to obtain the value of the vertical height of the bore hole by the apparatus outlined rather than obtaining it directly from the integrator 84 by applying thereto the cosine function rather than the function $1 - \cos \phi$ since, in the latter case, the integrator would be required to operate continuously in a region where it is multiplying by a factor close to unity and any slight error in its adjustment would cause a cumulative error in the reading of the odometer 98. The unity factor is introduced since the deviation of the well from the vertical is usually not great and, therefore, the $\cos \phi$ is very close to unity. In the arrangement illustrated, the difference between $\Delta d$ and $\Delta d \cos \phi$ is quite small, in which case the errors are accordingly diminished by a very large factor in the integrator 84 and a relatively accurate answer is obtained.

It is apparent that the computer may be employed while logging downward with only slight modifications of the apparatus such as changing the designations of the north and south odometers 82 and 83 and likewise changing the east and west designations on the odometers 78 and 79. Other than this change, the operation of the system is substantially the same for both types of use.

With very little modification, the computer may be adapted to be employed after the completion of a logging operation, in which case potentiometers are employed to feed the terminals 1—2, 3—4 and 6—7 and a knob is employed to rotate the shaft 42. These quantities would be obtained directly from the logging charts produced during the logging operation.

It may be desirable to indicate various steps along the line of the graph traced by the pen 68 on the chart 69. For instance, it may be desirable to indicate every hundred feet along the well bore by momentarily deflecting the pen 68 or it may be desired to produce an indication for every hundred feet of vertical depth of the well. This may be accomplished by driving an appropriate pen-deflecting mechanism from either the output shaft of the odometer 43 or 98 depending upon which type of indication it is desired to employ.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A computer for plotting a curve of the horizontal position of a well bore with respect to depth, comprising a first shaft, means for rotating said first shaft in accordance with a function $\Delta d$ representative of the incremental changes in depth of the well, a second shaft, means for rotating said second shaft as a direct function of an instantaneous angle $\phi$ between the well axis and the vertical, a third shaft, means for rotating said third shaft as a direct function of an instantaneous angle $\theta$ between the direction of well deviation and north, a fourth shaft, means responsive to the rotations of said first, second and third shafts for rotating said fourth shaft in accordance with the quantity $\Sigma \Delta d \sin \phi \sin \theta$, a fifth shaft, means responsive to the rotations of said first, second and third shafts for rotating said fifth shaft in accordance with the quantity $\Sigma \Delta d \sin \phi \cos \theta$, a recorder having a recording element positionable in a plane coordinate system, means for moving said recording element in accordance with the vectorial summations of the rotations of said fourth and fifth shafts, a sixth shaft, and means responsive to said first and second shafts for rotating said sixth shaft in accordance with the function $\Sigma \Delta d (1-\cos \phi)$, a seventh shaft, means responsive to said first and sixth shafts for rotating said seventh shaft in accordance with the function $\Sigma \Delta d \cos \phi$, and means for recording the rotation of said seventh shaft.

2. A computer for plotting a curve of the horizontal position of a well bore with respect to depth, comprising a first shaft, means for rotating said first shaft in accordance with a function $\Delta d$ representative of the incremental changes in depth of the well, a second shaft, means for rotating said second shaft as a direct function of an instantaneous angle $\phi$ between the well axis and the vertical, a third shaft, means for rotating said third shaft as a direct function of an instantaneous angle $\theta$ between the direction of well deviation and north, a fourth shaft, means responsive to the rotations of said first and second shafts for rotating said fourth shaft in accordance with the quantity $\Sigma \Delta d \sin \theta$, fifth and sixth shafts, means responsive to rotations of said third and fourth shafts for rotating said fifth and sixth shafts in accordance with the quantities $\Sigma \Delta d \sin \theta \sin \phi$ and $\Sigma \Delta d \sin \phi \cos \theta$, respectively, a recorder having a recording element positionable in a plane coordinate system, means for moving said recording element in accordance with the vectorial summations of the rotations of said fifth and sixth shafts, a seventh shaft, means responsive to said first and second shafts for rotating said seventh shaft in accordance with the function $\Sigma \Delta d (1-\cos \phi)$, an eighth shaft, means responsive to said first shaft and said seventh shaft for rotating said eighth shaft in accordance with the function $\Sigma \Delta d \cos \phi$, and means for recording the rotation of said seventh shaft.

References Cited in the file of this patent

UNITED STATES PATENTS

| | | |
|---|---|---|
| 1,928,971 | Dillon et al. | Oct. 3, 1933 |
| 2,496,674 | Omberg | Feb. 7, 1950 |
| 2,502,991 | Rast et al. | Apr. 4, 1950 |
| 2,843,941 | Story | July 22, 1958 |